United States Patent
Washizu

(10) Patent No.: US 7,760,205 B2
(45) Date of Patent: Jul. 20, 2010

(54) INFORMATION PROCESSING APPARATUS FOR EFFICIENT IMAGE PROCESSING

(75) Inventor: Yoshinori Washizu, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 484 days.

(21) Appl. No.: 11/189,029

(22) Filed: Jul. 25, 2005

(65) Prior Publication Data

US 2006/0061578 A1 Mar. 23, 2006

(30) Foreign Application Priority Data

Sep. 22, 2004 (JP) ............................ 2004-276238

(51) Int. Cl.
*G06F 15/16* (2006.01)
*G06F 9/46* (2006.01)

(52) U.S. Cl. .................. 345/504; 718/107; 718/108

(58) Field of Classification Search ........... 345/504; 718/100, 102, 107, 108
See application file for complete search history.

(56) References Cited

U.S. PATENT DOCUMENTS

| | | | |
|---|---|---|---|
| 5,299,309 A * | 3/1994 | Kuo et al. ................ | 345/541 |
| 5,349,680 A * | 9/1994 | Fukuoka ................. | 718/108 |
| 6,473,086 B1 * | 10/2002 | Morein et al. .......... | 345/505 |
| 6,614,438 B1 | 9/2003 | Bru | |
| 2003/0164824 A1 | 9/2003 | Parsons et al. | |
| 2006/0059484 A1 * | 3/2006 | Selvaggi et al. ........ | 718/100 |

FOREIGN PATENT DOCUMENTS

| | | |
|---|---|---|
| JP | 11-184718 | 7/1999 |
| JP | 2000-57329 | 2/2000 |
| JP | 2003-536124 | 12/2003 |

OTHER PUBLICATIONS

European Search Report dated Jun. 30, 2006, from corresponding European Application No. 05017246.9-2211.
Dave Baumann: "3dLabs P10 Technology Preview" Jun. 6, 2002, XP002378838, Retrieved from http://www.beyond3d.com/articles/p10tech/index.php?page=page2.inc.
Notification of Reason(s) for Refusal dated Jun. 24, 2008, from the corresponding Japanese Application.

* cited by examiner

*Primary Examiner*—Kee M Tung
*Assistant Examiner*—Jacinta Crawford
(74) *Attorney, Agent, or Firm*—Katten Muchin Rosenman LLP

(57) ABSTRACT

A plurality of sub-processors and a management processor process the first task. A graphic processor unit executes image processing corresponding to the first task processed by the management processor. One of the sub-processors performs a second task different from the first task. An image process related to the first task and originated in the sub-processor is accepted by the graphic processor unit and associated first rendering data is transferred to the graphic processor unit. Meanwhile, when the need arises in the one of the sub-processors for a second image process related to the second task, the one of the sub-processor saves second rendering data for the second image process in a main memory. Subsequently, when the graphic processor unit starts the second image process corresponding to the second task, the second rendering data is transferred from the main memory to a graphic memory.

1 Claim, 9 Drawing Sheets

INFORMATION PROCESSING APPARATUS FOR EFFICIENT IMAGE PROCESSING

BACKGROUND OF THE INVENTION

1. Field of the Invention

The present invention relates to an information processing technique and, more particularly, to an information processing technique that involves image processing.

2. Description of the Related Art

With the development of computer graphics technology in recent years, image data output from information processing apparatuses like a mainframe computer, a personal computer and game devices is becoming more and more complex and advanced. In this background, these information processing apparatuses have a built-in graphic processor dedicated to image processing apart from a main processor for ordinary processing, in order to eliminate system overhead by releasing the main processor from image processing.

One of the effective ways to achieve high-performance processing in these information processing apparatuses is to configure the main processor as a multiprocessor. A multiprocessor determines the order of execution of time-divided tasks corresponding to a plurality of applications. Parallel processing is achieved by allocating the tasks to a plurality of processors. The graphic processor is required to execute image processing corresponding to the plurality of tasks processed by the main processor in a manner compatible with the high-speed operation of the main processor.

With image data becoming more and more complex and advanced, it has become common for the image processing speed in the graphic processor to control the processing rate of the information processing apparatuses. In order for the main processor configured as a multiprocessor to allow the graphic processor to perform the operation for image processing required in one of a plurality of tasks, the main processor has to wait until the operation for image processing being performed by the graphic processor is completed. In the case of a task in which graphics output in response to the user's operation vary in real time as in a game, the wait may cause degradation in image quality such as video discontinuity or dropped frames.

SUMMARY OF THE INVENTION

The present invention has been done in view of the aforementioned problems and its object is to provide a technique for efficiently executing information processing involving operations for image processing.

The present invention according to one aspect provides an information processing apparatus. The information processing apparatus according to this aspect comprises: a main processor unit which integrally controls the information processing apparatus as a whole; and a graphic processor unit which performs operations for image processing, wherein, when the main processor unit is ready to transmit data related to a first task to the graphic processor unit in a situation in which the graphic processor unit is performing a second task different from the first task, the main processor unit saves the data related to the first task for later restoration at least until the graphic processor unit completes the process corresponding to the second task.

The term "task" refers to an application programmed to achieve a given object or contents of information processing included in the application. A task may have direct correspondence with the application. Alternatively, a task may correspond to a unit smaller than the application, such as input and output control or a command designated by a user. The requirement is that a task corresponds to some sort of process or a function. The phrase "data related to a task" may refer to image frame data rendered by the graphic processor unit or basic data referred to when generating the image frame data, or both.

Arbitrary combinations of the aforementioned constituting elements and implementations of the invention in the form of methods, apparatuses, systems, recording mediums and computer programs may also be practiced as additional modes of the present invention.

DETAILED DESCRIPTION OF THE INVENTION

First Embodiment

Figure 1:
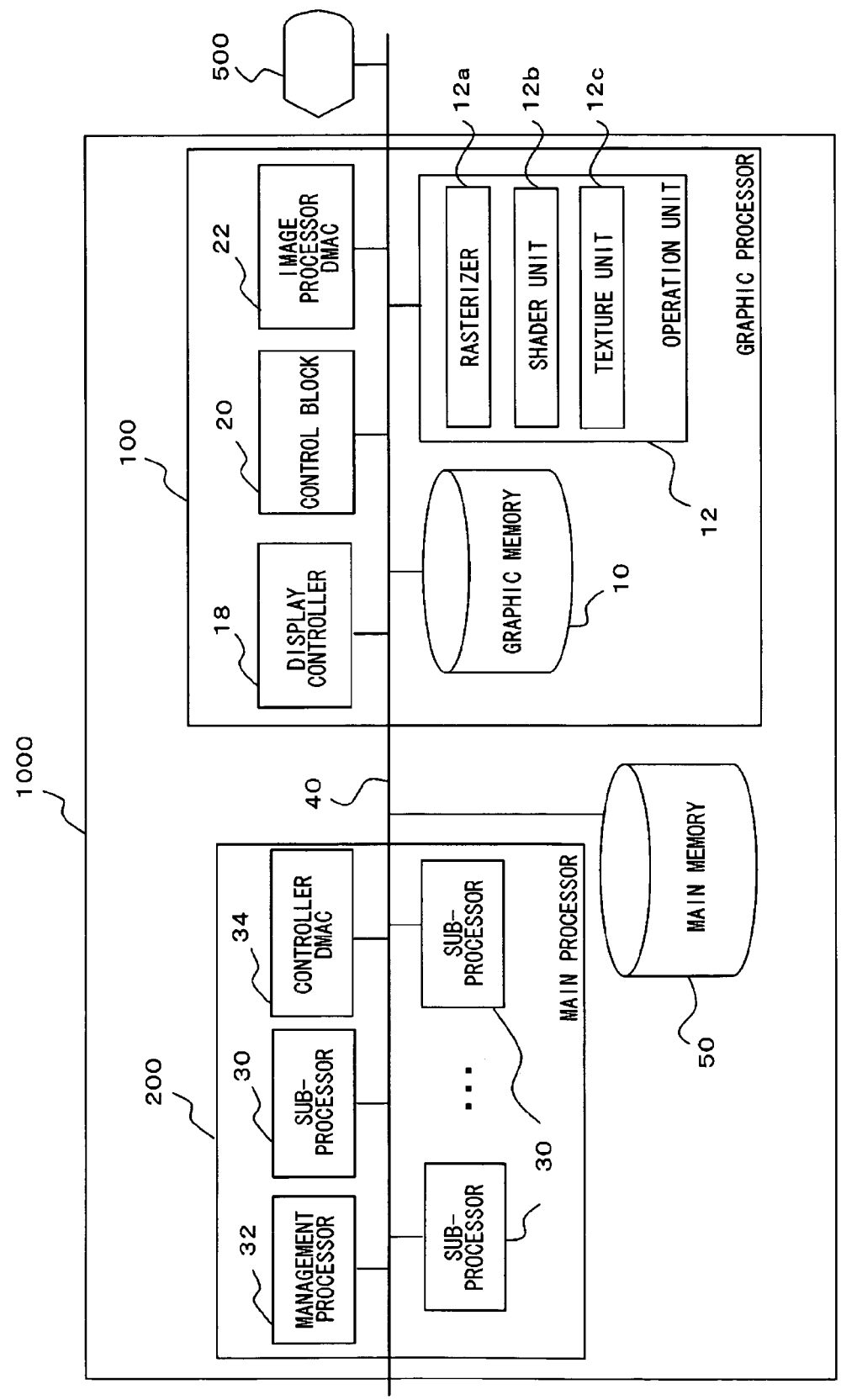
FIG. 1 is a block diagram illustrating the structure of an information processing apparatus according to a first embodiment of the present invention.

FIG. 1 is a block diagram illustrating the structure of an information processing apparatus 1000 according to a first embodiment of the present invention. The information processing apparatus 1000 comprises a graphic processor unit 100, a main processor unit 200 and a main memory 50. The information processing apparatus 1000 is connected to a display apparatus 500 which outputs images and graphics obtained as a result of processing in the main processor unit 200 and the graphic processor unit 100. The elements illustrated in FIG. 1 as functional blocks executing respective processes are implemented by hardware including a CPU, a memory and an LSI and by software including a program loaded into the memory and provided with reservation and management functions. Therefore, it will be obvious to those skilled in the art that the function blocks may be implemented by a variety of manners including hardware only, software only or a combination of both.

In the information processing apparatus 1000, an operating system (hereinafter, referred to as an OS), which provides functions and environments in which the information processing apparatus 1000 is efficiently used and which integrally controls the apparatus as whole, is executed. A plurality of software applications (hereinafter, simply referred to as applications) are run on the OS.

The main processor unit 200 comprises a plurality of sub-processors 30, a management processor 32 and a direct memory access (DMA) controller 34 on the controlling end (hereinafter, simply referred to as a main processor DMA controller 34). The sub-processors 30, the management processor 32 and the main processor DMA controller 34 are capable of communicating with each other via a bus 40. The management processor 32 time-divides tasks corresponding to a plurality of applications. Parallel processing is achieved by allocating, for each time slice, the tasks corresponding to the plurality of applications to the sub-processors 30 for execution.

The main processor DMA controller 34 controls data transfer to and from the main memory 50 and the graphic processor unit 100, in accordance with an instruction from the sub-processors 30 or from the management processor 32.

In the first embodiment, the main processor unit 200 and the graphic processor unit 100 cooperate with each other to execute processing. The graphic processor unit 100 executes image processing related to tasks processed by the main processor unit 200. It also outputs images and graphic generated in the process to the display apparatus 500 or store them in a storage (not shown). Cooperation between the main processor unit 200 and the graphic processor unit 100 will be described later.

The main memory 50 is a storage area primarily used by the main processor unit 200. The main memory 50 stores data related to the tasks corresponding to the plurality of applications. For example, modeling data obtained by processing a task related to computer graphics in the main processor unit 200 is temporarily stored.

As will be described below, the main memory 50 may also store data obtained from processing operations in the graphic processor unit 100.

The graphic processor unit 100 is dedicated to processes related to image and performing a rendering process, etc. The graphic processor unit 100 comprises a graphic memory 10, an operation unit 12, a display controller 18, a control block 20 and a DMA controller 22 at the graphic processing end (hereinafter, referred to as a graphic processor DMA controller 22). These blocks are connected to each other via the bus 40 for transmission and reception of data signals between the blocks.

The graphic memory 10 is a memory area dedicated to graphic-related data used and managed by the graphic processor unit 100. In addition to a frame buffer for storing image frame data and a z buffer, the graphic memory 10 further comprises areas respectively corresponding to vertex data, texture data and a color look-up table, which are basic data referred to when rendering image frame data.

The operation unit 12 processes various operations related to graphics in accordance with an instruction from the main processor unit 200. One example of such operations is a series of rendering steps for generating image frame data from three-dimensional modeling data by performing coordinate transform, hidden surface removal and shading, and for writing the generated data in the frame buffer. For high-speed execution of three-dimensional graphics-related processes, the operation unit 12 comprises functional blocks such as a rasterizer 12a, a shader unit 12b and a texture unit 12c.

The rasterizer 12a receives vertex data of a primitive to be rendered and performs a view transform in which a primitive in a three-dimensional space is transformed by projection into a graphic on a rendering plane. Further, the rasterizer 12a performs a rasterizing process in which the graphic on the rendering plane is scanned in the horizontal direction of the rendering plane so as to transform, row by row, the graphic into quantized pixels. The rasterizer 12a develops the primitive into pixels and computes pixel information for each pixel. The pixel information includes RGB color values, an α value indicating transparency and a Z value indicating depth from a view point.

The rasterizer 12a generates a pixel area consisting of a plurality of pixels of a predetermined size along the scan line and outputs the generated area to the shader unit 12b and the texture unit 12c. The pixel area output from the rasterizer 12a is temporarily stacked in a queue. The shader unit 12b sequentially processes pixel areas stacked in the queue.

The shader unit 12b performs a shading process by referring to the pixel information computed by the rasterizer 12a, determines pixel colors after texture mapping by referring to texel information obtained by the texture unit 12c, and writes image frame data after shading in the frame buffer in the graphic memory 10. The shader unit 12b further performs processes like fogging and alpha blending on the image frame data written in the frame buffer so as to determine rendering colors ultimately to be reproduced, and updates the image frame data in the frame buffer.

The texture unit 12c receives parameters designating texture data from the shader unit 12b, reads the requested texture data from a texture buffer in the graphic memory 10. The texture unit 12c performs a predetermined process on the texture data and outputs resultant data to the shader unit 12b.

The control block 20 is a block for controlling the graphic processor unit 100 as a whole and integrally controls the operation unit 12, the graphic memory 10 and the display controller 18. The control block 20 is also responsible for management of synchronization of data transfer between the blocks, interrupt processing and timer management.

The display controller 18 generates horizontal and vertical synchronizing signals and reads pixel data of the image frame data line by line from the frame buffer in the graphic memory 10, in accordance with the timing for display on the display apparatus 500. Further, the display controller 18 transforms the digital pixel data read line by line and comprising R, G and B color values into a format adapted to the display apparatus 500 before outputting to the display apparatus 500.

The graphic processor DMA controller 22 controls data transfer between the main processor unit 200 and the graphic memory 10 and between the main memory 50 and the graphic memory 10, in accordance with an instruction from the control block 20 and the like.

A description will now be given of the operation of the information processing apparatus 1000 with the structure as described above, highlighting the inventive cooperation between the main processor unit 200 and the graphic processor unit 100.

Figure 2:
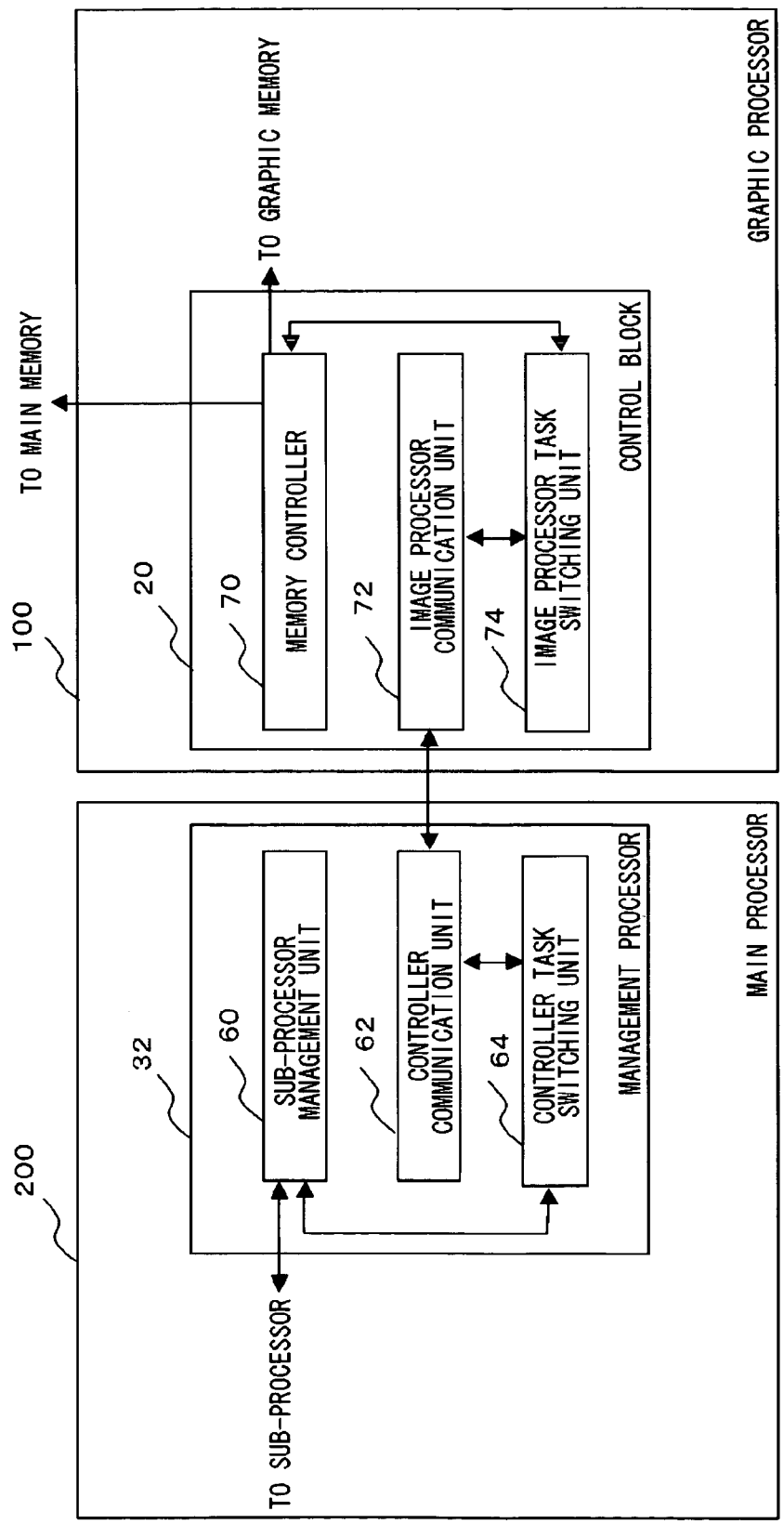
FIG. 2 is a block diagram illustrating the structure of a management processor in a main processor unit and the structure of a control block in a graphic processor unit according to the first embodiment.

FIG. 2 is a block diagram illustrating the structure of the management processor 32 in the main processor unit 200 and the structure of the control block 20 in the graphic processor unit 100. The management processor 32 comprises a sub-processor management unit 60 which determines the order of execution of time-divided tasks and appropriately allocates the tasks to the sub-processors 30, a main processor communication unit 62 which exchanges signals with the graphic processor unit 100, and a main processor task switching unit 64 which controls processes related to task switching. The control block 20 comprises a memory controller 70 which manages, task by task, data stored in the graphic memory 10, a graphic processor communication unit 72 for exchanging signals with the main processor unit 200 and a graphic processor task switching unit 74 which controls processes related to task switching in graphic processor unit 100 in response to the task switching in the main processor unit 200.

Figure 3:
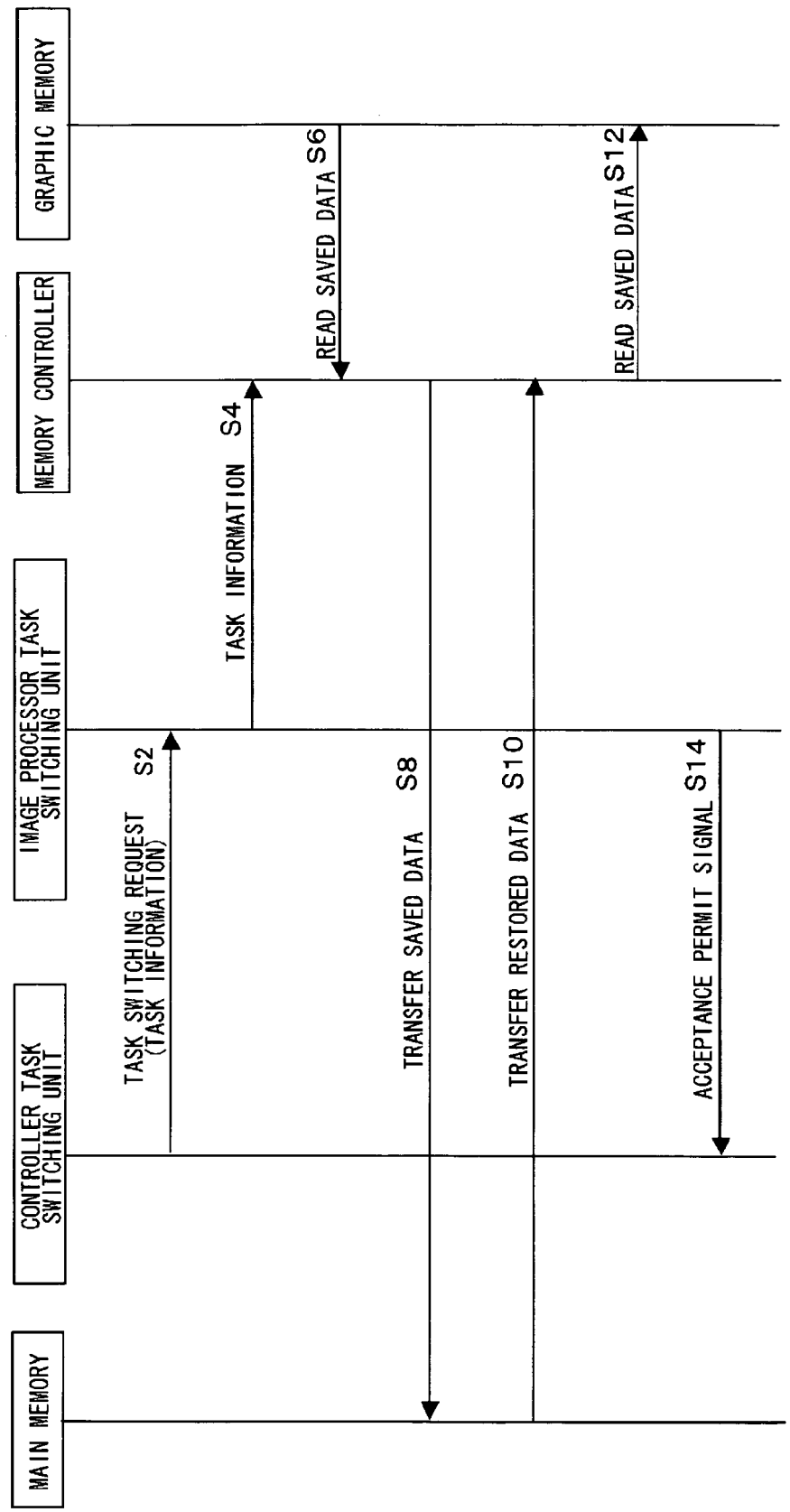
FIG. 3 is a timing chart illustrating a procedure in which the graphic processor unit switches between tasks in cooperation with the task switching in the main processor unit.

FIG. 3 is a timing chart illustrating a procedure performed by the management processor 32 and the control block 20 shown in FIG. 2, whereby the graphic processor unit 100 switches between tasks in cooperation with the task switching in the main processor unit 200. The main processor unit 200 switches between tasks processed by the management processor 32, in accordance with an external signal such as the user's command input, or in accordance with an internal scheduling. Some of the sub-processors 30 may continue to process tasks that they had been processing.

In step S2, the main processor task switching unit 64 of the management processor 32 allows the main processor communication unit 62 to transmit a task switching request signal including information related to a task to be performed after the switching (hereinafter, referred to as a first task) to the graphic processor task switching unit 74 via the graphic processor communication unit 72. The transmission of the signal may be based on the internal scheduling of the management processor 32 and may occur, for example, at a point of time that precedes the actual task switching by a predetermined period. In response to the task switching request from the main processor task switching unit 64, the graphic processor task switching unit 74 starts suspend processing for the task being performed in the operation unit 12 (hereinafter, referred to as a second task). In step S4, the graphic processor task switching unit 74 transmits the information related to the first task to the memory controller 70. In step S6, the memory controller 70 reads, if needed, image related data such as image frame data, texel information, etc, related to the second task, from the graphic memory 10. In step S8, the memory controller 70 saves the data thus read in the main memory 50. Subsequently, the memory controller 70 searches the main memory 50, in which image related data is saved in a previous time slice, for the data related to the first task, in step S10. When the target data is found, the memory controller 70 reads the data related to the first task from the main memory 50. In step S12, the memory controller 70 restores the data in the graphic memory 10. When the restoration of the data related to the first task is complete, the graphic processor task switching unit 74 transmits, in step S14, an acceptance permit signal, indicating that the graphic processor unit 100 is ready for task switching, from the graphic processor communication unit 72 to the main processor task switching unit 64 via the main processor communication unit 62. The main processor task switching unit 64 acknowledges the acceptance permit signal and then switches the second task being processed by the management processor 32 to the first task. Meanwhile, the graphic processor task switching unit 74 switches between tasks in the graphic processor unit 100 with, for example, allowing the operation unit 12 to perform operations for image processing corresponding to the first task by referring to the data related to the first task restored in the graphic memory 10.

The task switching request signal and the acceptance permit signal exchanged between the main processor communication unit 62 and the graphic processor communication unit 72 may be interrupt signals. The task switching request signal originated by the main processor communication unit 62 may not include the information related to the first task. In this case, subsequent to step S2 and prior to step S10, the graphic processor task switching unit 74 may issue an inquiry to the main processor task switching unit 64 so as to acquire the information related to the first task. The destination of saving the data related to the second task may be a memory other than the graphic memory 10 inside the graphic processor unit 100 or an external memory accessible by the graphic processor unit 100, instead of the main memory 50.

The graphic processor task switching unit 74 may acquire, in step S2, a data structure related to image processing originated in the first task, size allocation, etc. as the information related to the first task. In accordance with the information thus acquired, the memory controller 70 may update an address map of the graphic memory 10 to adapt it to the data structure corresponding to the first task, after saving the data related to the second task in the main memory 50 in step S8. With this, the graphic processor unit 100 is capable of disabling acceptance of requests for image processing originated in a task other than the first task processed by the main processor unit 200. The operation and workings for this will be described later in detail.

Referring to step S2 of FIG. 3, the control block 20 of the graphic processor unit 100 may set a flag at an address used by the graphic processor communication unit 72, after the main processor task switching unit 64 transmitted a task switching request signal to the graphic processor task switching unit 74, so as to disable acceptance of a subsequent request for image processing from the main processor unit 200. With this, the sub-processor 30 is capable of detecting that a process related to task switching is being performed in the graphic processor unit 100 without placing an inquiry to the management processor 32. Further, the graphic processor unit 100 can secure resources for use in task switching.

Instead of steps S4 through S12 of FIG. 3, the following steps may be performed. When the task switching request signal is received in step S2, the graphic processor unit 100 has stored therein several unprocessed image processing tasks related to the second task that the graphic processor unit 100 had been requested to execute by the main processor unit 200. The graphic processor task switching unit 74 identifies the last image processing task, which is accepted immediately before the task switching request signal, related to the second task. For example, the graphic processor task switching unit 74 may set a flag at an address storing the last image processing task in an address map storing unprocessed image processing tasks. Subsequently, the unprocessed image processing tasks are sequentially processed by the operation unit 12 and the like. When the last image processing task, which occurred prior to the task switching request signal and identified as such by setting the flag, are completed, the graphic processor task switching unit 74 transmits an acceptance permit signal indicating that the graphic processor unit 100 is ready for task switching to the main processor task switching unit 64, as in step S12 of FIG. 3. With this, the main processor unit 200 can switch between tasks and the graphic processor unit 100 can execute image processing corresponding to the task after the switching, as already described above.

In the variation described above, the main processor unit 200 has to withhold task switching until the graphic processor unit 100 completes the unprocessed image processing tasks. A time-out function may be provided such that, when the tasks are not completed after a predetermined time elapses since the transmission of the task switching request signal in step S2, step S4 and the subsequent steps of FIG. 3 are performed and the data related to the unprocessed image processing tasks is saved in the main memory 50. With this, it is ensured that the unprocessed image processing tasks, which have been already requested by the main processor unit 200, related to the second task are performed as much as possible within the time constraints determined by a time required to start the implementation of task switching. Another advantage is that the time required to start the implementation of task switching does not vary with the variation in the number of unexecuted image processes that depends on the application being executed and so on. In an application that tolerates a relatively long period of time required to start the implementation of task switching, efficient image processing is possible by setting and utilizing the relatively long available time.

Through the processes described above, the graphic processor unit 100 is capable of switching between tasks to execute image processing corresponding to the task switching by the main processor unit 200. The management processor 32 applies control such that it allocates divided tasks to the sub-processors 30 for parallel operation. Accordingly, when the need arises in one of the sub-processors 30 for image processing, data necessary for rendering (hereinafter, simply referred to as rendering data) is transferred from the sub-processor 30 to the graphic memory 10. Image processing is executed by the operation unit 12 by referring to the rendering data.

Figure 4A:
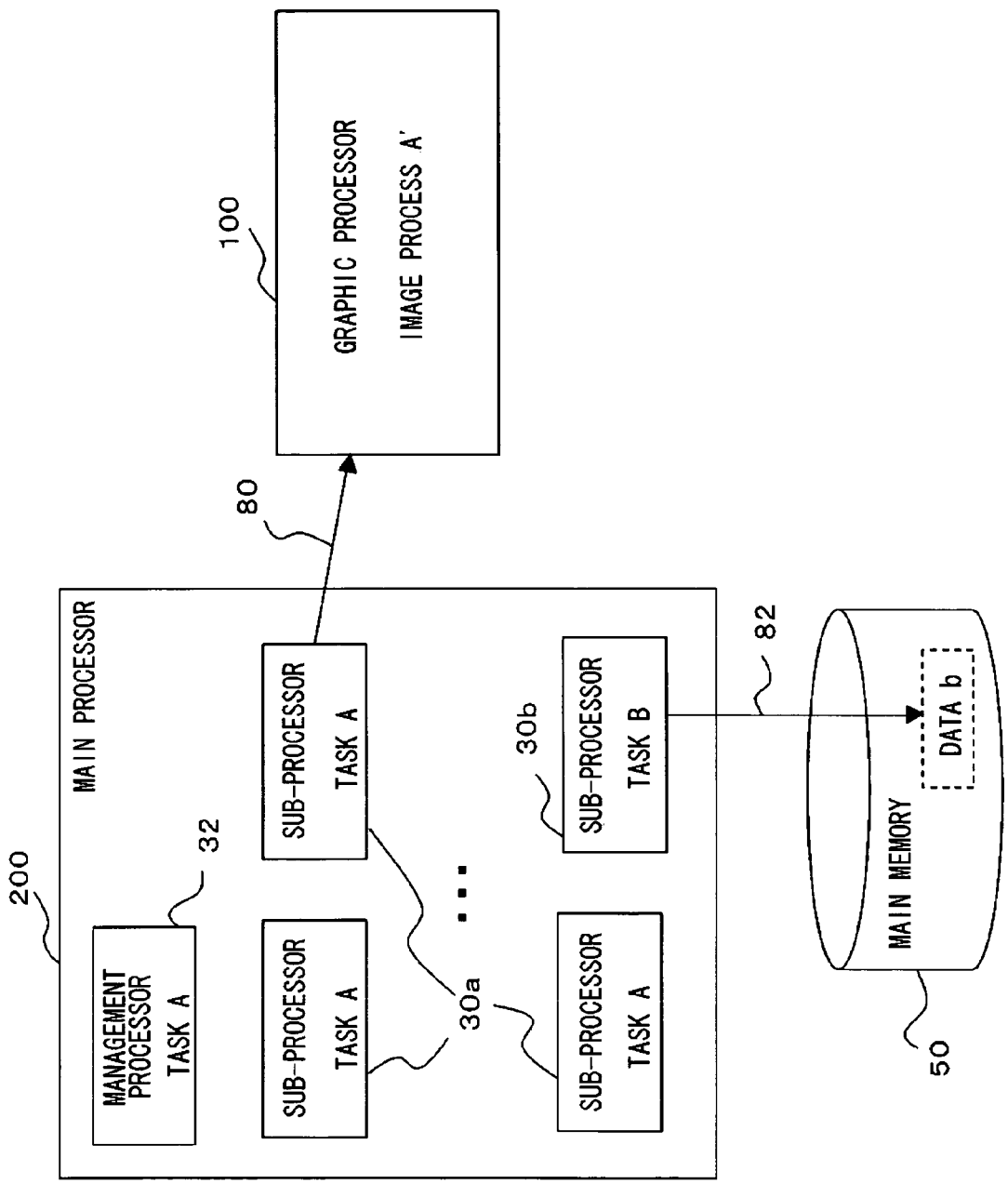
FIG. 4A is a schematic illustration of how tasks are being processed by sub-processors, the management processor and the graphic processor unit according to the first embodiment.

Since the main processor unit 200 includes a plurality of sub-processors 30, some of the sub-processors 30 may be performing a task different from the task processed by the management processor 32. FIG. 4A is a schematic illustration of this situation. Referring to FIG. 4A, the sub-processors 30*a* are processing the same task A as performed by the management processor 32. The sub-processor 30*b*, however, is performing a different task B. Meanwhile, the graphic processor unit 100 is performing an image process A' corresponding to the same task A as performed by the management processor 32, with which the graphic processor unit 100 is in cooperation as described above. In this state, the image process A' related to the task A originated in the sub-processor 30*a* is accepted by the graphic processor unit 100 and so the associated rendering data a is transferred to the graphic processor unit 100 (arrow 80). In contrast, when the need arises for the sub-processor 30*b* to perform an image process B' related to the task B, the sub-processor 30*b* saves rendering data b for the image process B' in the main memory 50 (arrow 82).

The sub-processors 30*a* and 30*b* may not have the previous knowledge as to which task is addressed by the image processing in the graphic processor unit 100. For example, as mentioned before, by updating upon task switching the address map of the graphic memory 10 so as to adapt it to the rendering data a related to the task A, it is ensured that an attempt of the sub-processor 30*b* to transfer the rendering data b to the graphic memory 10 fails. When this happens, the sub-processor 30*b* transfers the rendering data b, which could not be transferred to the graphic memory 10, to the main memory 50.

Figure 4B:
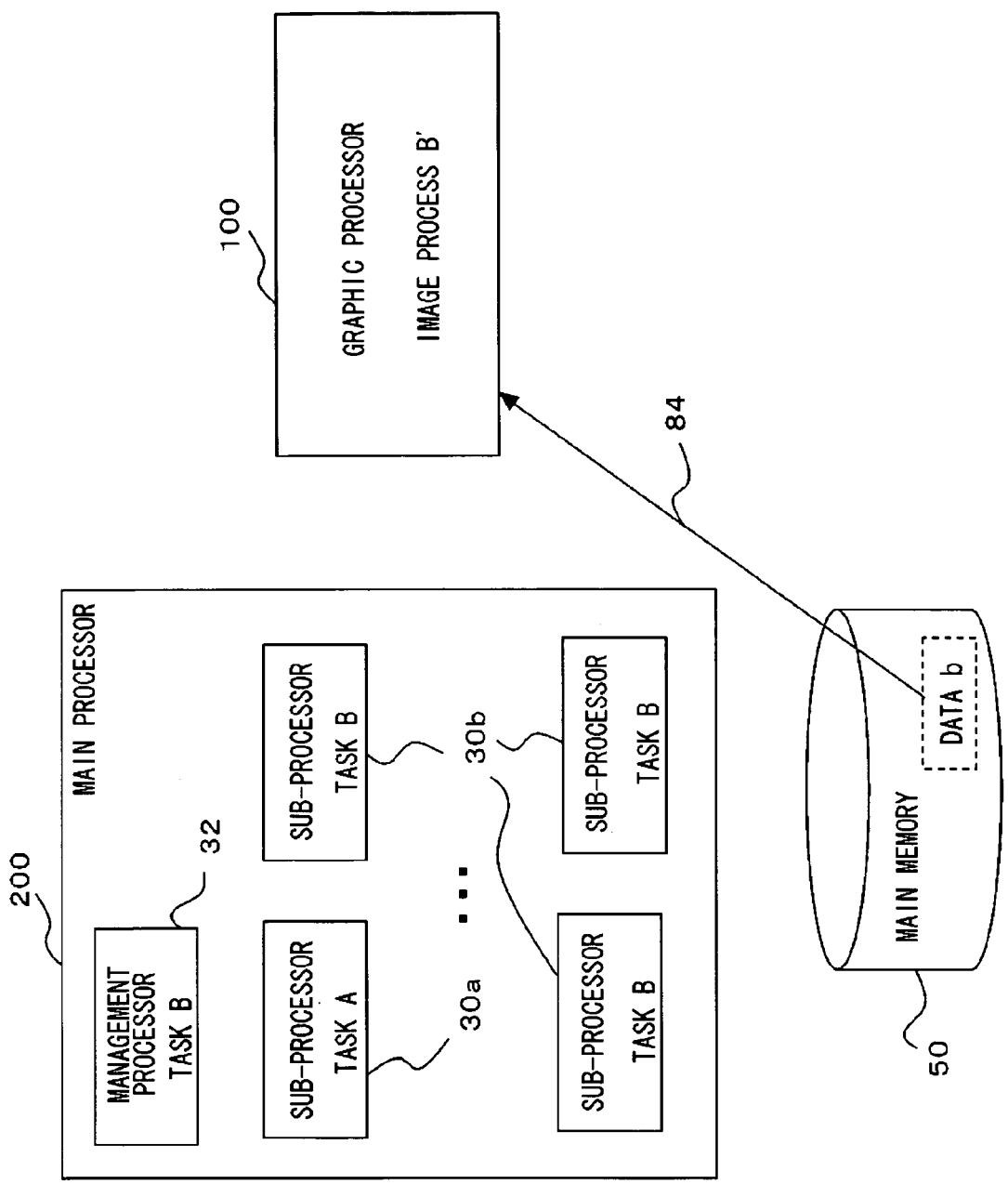
FIG. 4B is a schematic illustration of how tasks are being processed by the sub-processors, the management processor and the graphic processor unit according to the first embodiment.

As illustrated in FIG. 4B, the rendering data b transferred to the main memory 50 is transferred to the graphic memory 10 (arrow 84) when the management processor 32 switches to the task B and the graphic processor unit 100 is ready to accept the image process B' corresponding to the task B. In this process, the management processor 32 may manage saving of the data b in the main memory 50. When the management processor 32 switches to the task B, the main processor task switching unit 64 may read the saved rendering data b and transfer the same to the graphic memory 10. Alternatively, the management processor 32 may activate the main processor DMA controller 34 so as to transfer the data from the main memory 50 to the graphic memory 10. By using the main processor DMA controller 34, the management processor 32 is transferring the rendering data b in immediate response to the switching to the task B, without being interrupted in the middle of its processing related the management of the sub-processors 30 and allocation of tasks.

As described above, according to the first embodiment, the graphic processor unit 100 switches between its tasks in accordance with the task switching in the main processor unit 200. Accordingly, even when the information processing apparatus 1000 is executing a plurality of applications, the graphic processor unit 100 is allowed to operate to address only one application in a given time slice. Consequently, the entire resources constituting the graphic processor unit 100 are available for use in image processing corresponding to the one application. With this, efficient image processing is achieved, the number of addresses dynamically allocatable is increased and processing of large image data is enabled.

It is also possible to perform the process corresponding to the process in the main processor unit 200 with its high-speed operation by the graphic processor unit 100, without complicating the structure of the graphic processor unit 100. In the event of an abrupt task switching initiated by the user, image processing corresponding to the requested task can be executed without waiting for the completion of tasks being processed by the graphic processor unit 100. Accordingly, the likelihood of occurrence of video discontinuity or dropped frames is reduced. Even when the need for image processing arises concurrently in a plurality of applications, image processing according to the scheduling is possible by at least prioritizing the task being performed by the management processor 32.

By temporarily storing the rendering data related to a task other than the task being processed by the management processor 32 in the main memory 50, the load on the sub-processors 30 is reduced.

Second Embodiment

In the first embodiment, when the management processor 32 of the main processor unit 200 switches between tasks, the main processor task switching unit 64 transmits a task switching request signal to the graphic processor task switching unit 74 in step S2 of FIG. 3. In the second embodiment, step S2 is replaced by a step in which a common register shared by the main processor unit 200 and the graphic processor unit 100 is used. The structure of the information processing apparatus 1000 remains unchanged from that of FIG. 1 and FIG. 2. The following description concerns differences from the function of FIG. 2 and the procedure of FIG. 3 in the first embodiment.

Figure 5:
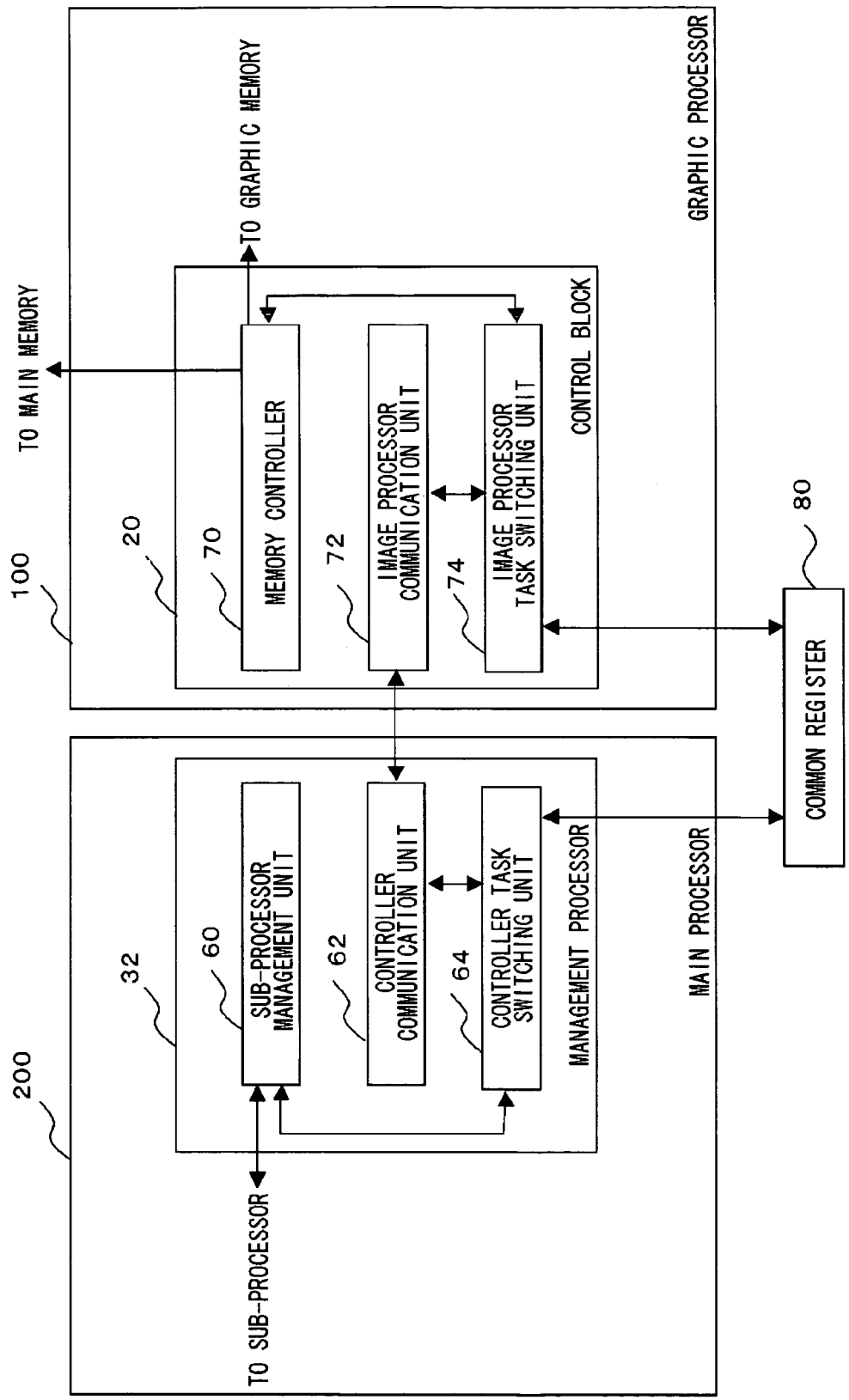
FIG. 5 is a block diagram illustrating the structure of the management processor in the main processor unit, the structure of the control block in the graphic processor unit and the structure of a shared processor according to a second embodiment of the present invention.

FIG. 5 is a block diagram illustrating the structure of the management processor 32 provided in the main processor unit 200, the structure of the control block 20 provided in the graphic processor unit 100 and the structure of a common register 80 accessible by the management processor 32 and the control block 20. In addition to the functions as described in the first embodiment, the main processor task switching unit 64 of the management processor 32 is provided with the function of writing in the common register 80. The graphic processor task switching unit 74 of the control block 20 additionally has the function of reading from the common register 80 and detecting a task switching request.

The main processor task switching unit 64 writes, in the common register 80, information related to the first task performed after the switching, in order to effect task switching. Similarly to the first embodiment, the main processor task switching unit 64 may write the data structure related to the image processing originated in the first task, the size allocation and the like. The graphic processor task switching unit 74 monitors the writing by the main processor task switching unit 64 by, for example, reading information from the common register 80 at regular time intervals. The writing may be detected by setting a write flag in the common register 80. Upon detection of writing in the common register 80, the graphic processor task switching unit 74 performs suspend processing for the tasks being performed so far in the graphic processor unit 100. Subsequently, those steps similar to steps S4 through S14 of FIG. 2 are performed so that the task switching in the main processor unit 200 and the graphic processor unit 100 is completed.

The information written by the main processor task switching unit 64 in the common register 80 may not include the information related to the first task. The graphic processor task switching unit 74 may issues an inquiry to the main processor task switching unit 64 so as to acquire the information related to the first task, when the graphic processor task switching unit 74 detects the writing in the common register 80.

According to the second embodiment, a task switching request is issued without using an interrupt signal so that similar effects as those of the first embodiment are achieved by means of a stable procedure.

Third Embodiment

In the first embodiment, the transfer of rendering data from the main processor unit 200 to the graphic processor unit 100 is performed by the individual sub-processors 30 performing the task that requires the associated image processing or the management processor 32 managing the data saved in the main memory 50.

Figure 6:
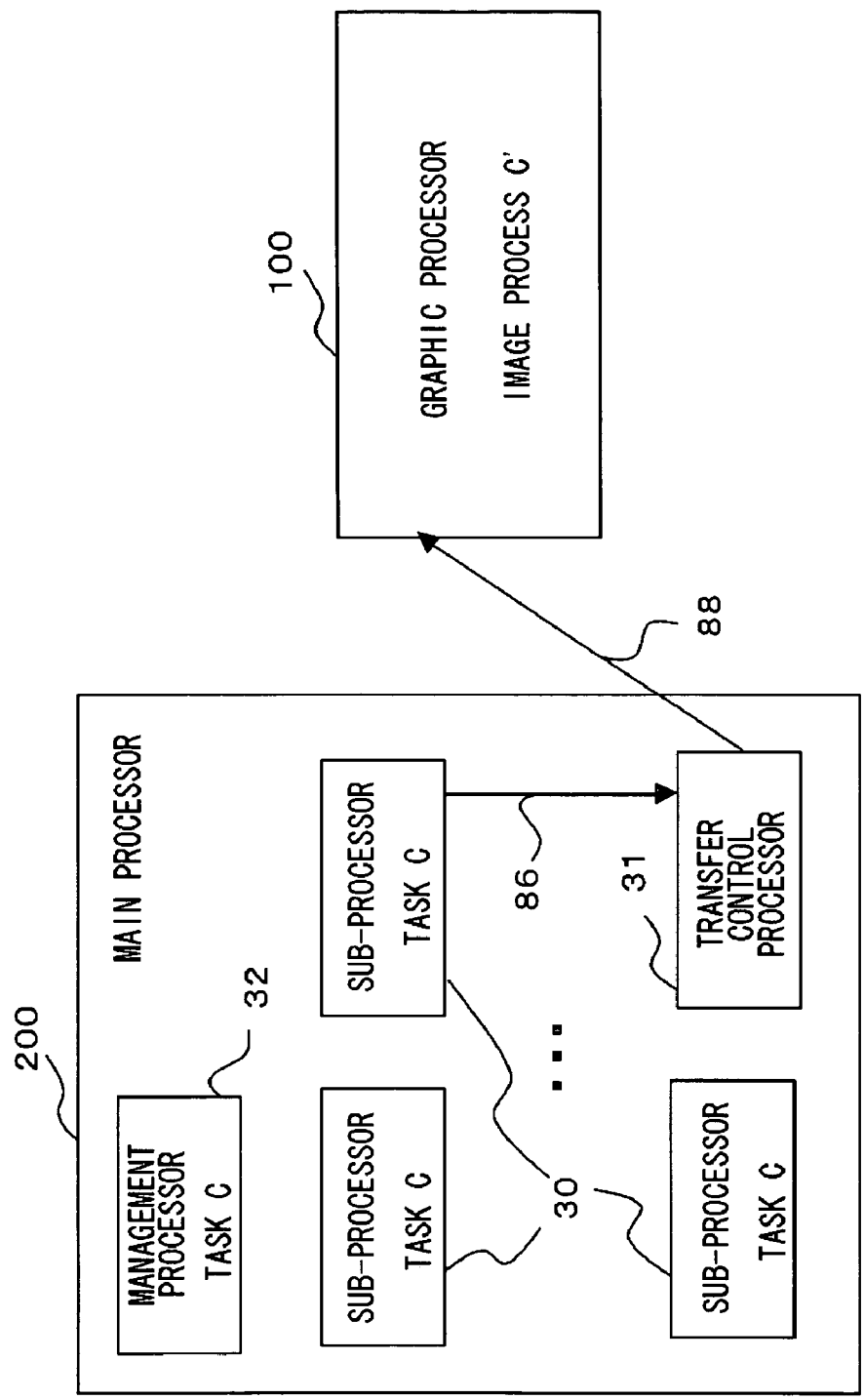
FIG. 6 is a schematic illustration of a relation between the sub-processors and a transfer control processor according to a third embodiment of the present invention.

In the third embodiment, the transfer of rendering data for the image processing originated while the sub-processors 30 are processing tasks is controlled by a single sub-processor 30, as illustrated in FIG. 6. In FIG. 6, the sub-processor 30 in this control is referred to as a transfer control processor and denoted by a numeral 31 in order to differentiate it from the other sub-processors 30. The rendering data to be transferred to the graphic processor unit 100 is transiently transferred from the sub-processors 30 to the transfer control processor 31 (as indicated by arrow 86), whereupon the transfer control processor 31 performs the transfer appropriately (as indicated by arrow 88). The structure of the graphic processor unit 100, the main processor unit 200 and the main memory 50 remains unchanged from that of FIG. 1 and FIG. 2. The following description concerns differences from the first embodiment.

Figure 7:
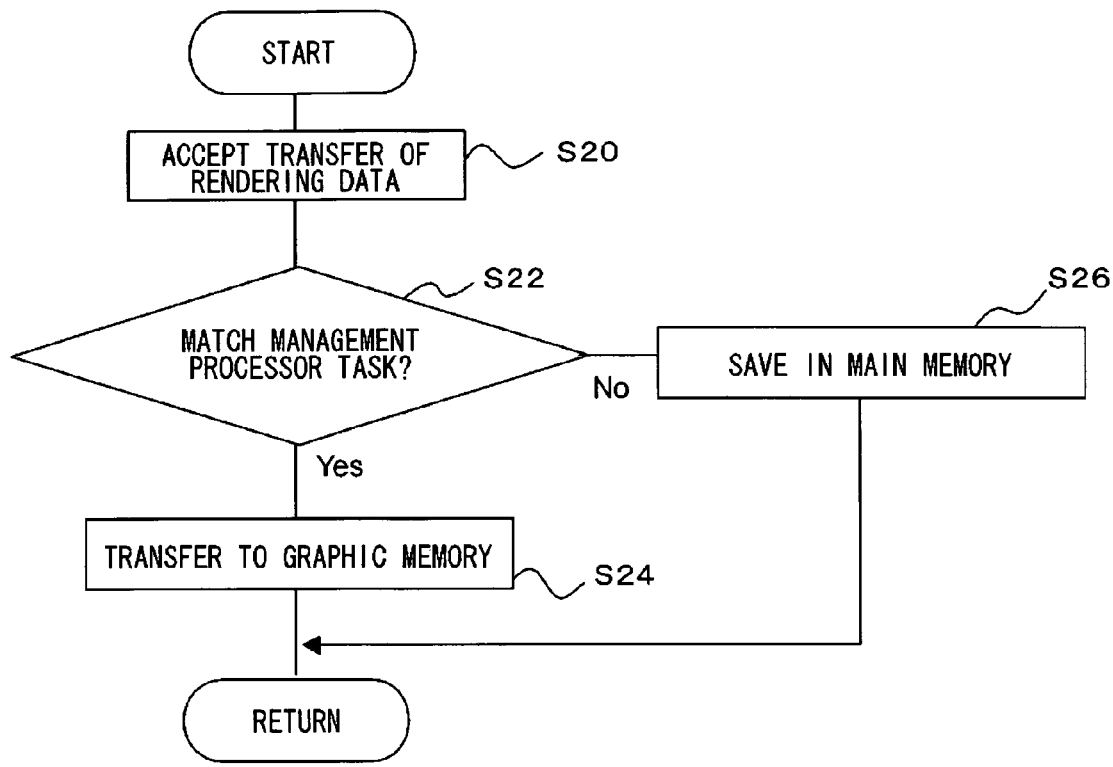
FIG. 7 is a flowchart illustrating a procedure for data transfer performed by the transfer control processor according to the third embodiment.

FIG. 7 is a flow chart illustrating a procedure for data transfer performed by the transfer control processor 31. When the need for image processing arises in the sub-processor 30 performing the task C, the sub-processor 30 transfers rendering data for the image processing to the transfer control processor 31. The transfer control processor 31 receiving in step S20 the rendering data thus transferred compares in step S22 the task C being processed by the sub-processor 30 originating the transfer with the task being processed by the management processor 32, so as to determine whether the tasks match. If the tasks match (Yes in S22), the transfer control processor 31 transfers in step S24 the rendering data transferred from the sub-processor 30 to the graphic memory 10.

If the task C being processed by the requesting sub-processor 30 is different from the task being processed by the management processor 32 (No in S22), the transfer control processor 31 transfers in step S26 the rendering data transferred from the sub-processor 30 to the main memory 50. Subsequently, when the main processor unit 200 switches to the task C, the transfer control processor 31 transfers the rendering data saved in the main memory 50 to the graphic memory 10. In this process, a DMA controller (not shown) provided inside the transfer control processor 31 may be activated to transfer data. With this, the transfer control processor 31 can perform the transfer process in immediate response to the switching to the task C, such that the process responsive to a transfer request from another sub-processor is not interrupted. An area for storing rendering data from the transfer control processor 31 may be reserved in the main memory 50.

For comparison in step S22 of FIG. 7 between the task C being processed by the sub-processor 30 and the task being processed by the management processor 32, the transfer of rendering data to the graphic processor unit 100 may be attempted once and a determination that the tasks do not match may be made if the transfer is not accepted as mentioned in the first embodiment.

According to the above-described procedure, the graphic processor unit 100 is capable of executing the image processing corresponding to the task C, by referring to the rendering data transferred by the transfer control processor 31 to the graphic memory 10.

The switching to the task C by the management processor 32 may be detected by the transfer control processor 31 as it receives a switching signal originated by the management processor 32. Alternatively, the transfer control processor 31 may monitor the tasks of the management processor 32 at regular time intervals.

As described, according to the third embodiment, by configuring one of the sub-processors 30 as a processor dedicated to data transfer to the graphic processor unit 100, similar effects as those of the first embodiment are achieved without requiring the cost to introduce additional components. Further, since the sub-processor 30 originating the transfer can continue to process operations other than the transfer process while the rendering data is being transferred to the graphic processor unit 100, the system performance is improved.

Fourth Embodiment

In the first through third embodiments, the main processor unit 200 is the primary entity for data transfer. In the fourth embodiment, the graphic processor unit 100 serves as a primary entity for data transfer. In this way, transfer of rendering data can occur according to a timing schedule suitable for the graphic processor unit 100. The structure of the graphic processor unit 100, the main processor unit 200, the main memory 50, etc. remains unchanged from that of FIG. 1 and FIG. 2. The cooperative task switching by the main processor unit 200 and the graphic processor unit 100 may be performed in accordance with the same procedure as described in the first embodiment with reference to FIG. 3 or as described in the second embodiment.

Figure 8:
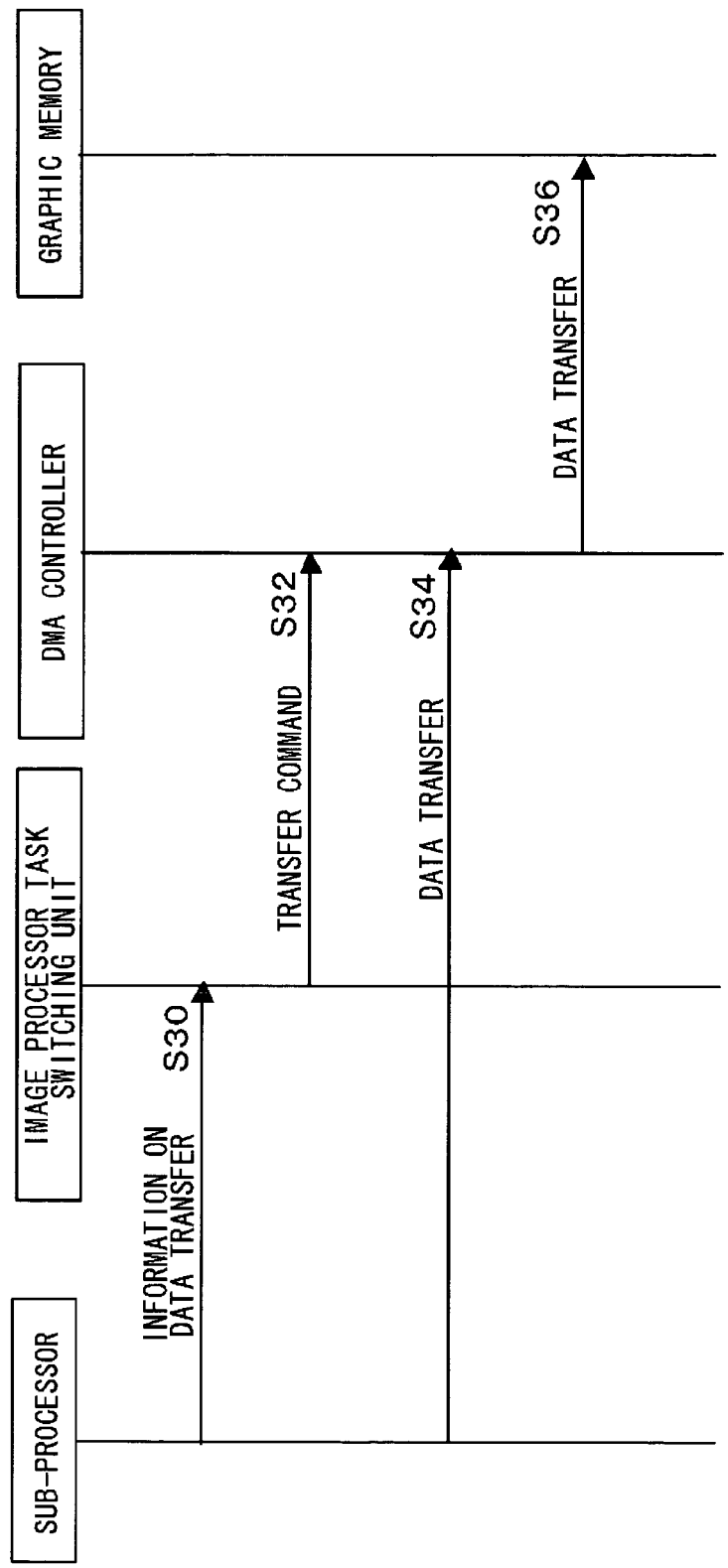
FIG. 8 is a time chart illustrating a procedure for transferring data necessary for image processing from the main processor unit to the graphic processor unit according to a fourth embodiment of the present invention.

FIG. 8 is a time chart illustrating a procedure for transferring data necessary for image processing from the main processor unit 200 to the graphic processor unit 100 according to the fourth embodiment. FIG. 8 illustrates a case where the need for image processing arises in the sub-processor 30a processing the task A while the management processor 32 of the main processor unit 200 is also processing the task A. At this point of time, the graphic processor unit 100, in cooperation with the main processor unit 200, is performing an image process A' corresponding to the task A being processed by the management processor 32. In step S30, the sub-processor 30a transmits a signal indicating the transfer of rendering data a to the graphic processor task switching unit 74 of the control block in the graphic processor unit 100. The signal includes the address of the rendering data in the sub-processor 30a, the transfer size, the transfer direction, etc. In step S32, the graphic processor task switching unit 74 outputs a data transfer command including the transfer information it received to the graphic processor DMA controller 22. In step S34, the graphic processor DMA controller 22 reads the rendering data from the sub-processor 30 in accordance with the input transfer information. In step S36, the graphic processor DMA controller 22 outputs the rendering data a read out in step S36 to the graphic memory 10.

The graphic processor unit 100 is configured such that, when, for example, the sub-processor 30b is processing the task B different from the task A being processed by the management processor 32, as in the case of FIG. 4A, and when the need arises for the image process B', the graphic processor unit 100 performing the image process A' corresponding to the task A does not accept the process of step S30 of FIG. 8 by the sub-processor 30b. In this case, the sub-processor 30b saves the rendering data b in the main memory 50 as in the first embodiment.

Subsequently, as in FIG. 4B referred to in the first embodiment, at a point of time when the management processor 32 switches to the task B and the graphic processor unit 100 is ready to accept the image process B', the management processor 32 transmits the information including the data address of the rendering data b saved in the main memory 50, the transfer size, etc. to the graphic processor task switching unit 74 of the graphic processor unit 100. The graphic processor task switching unit 74 outputs a data transfer command that includes the transfer information it received to the graphic processor DMA controller 22. The graphic processor DMA controller 22 reads the rendering data b from the main memory 50 in accordance with the input information and outputs the read data to the graphic memory 10.

As described, according to the fourth embodiment, the graphic processor unit 100 is capable of acquiring data necessary for image processing from the main processor unit 200 at a timing schedule suitable for the graphic processor unit 100, by using the graphic processor DMA controller 22 provided inside the graphic processor unit 100. With this, the load placed upon the graphic processor unit 100 and the main processor unit 200 in the data transfer process is reduced. The transfer process, with an exception of a transfer request and the like, can proceed in parallel with the operation in these processors. Accordingly, similar effects as those of the first embodiment are achieved while successfully reducing the overhead involved in task switching.

Fifth Embodiment

Similarly to the third embodiment, the fifth embodiment provides that a single sub-processor 30 controls data transfer necessary for image processing, and, similarly to the fourth embodiment, the graphic processor DMA controller 22 inside the graphic processor unit 100 performs the transfer process. The structure of the graphic processor unit 100, the main processor unit 200, the main memory 50, etc. remains unchanged from that of FIG. 1 and FIG. 2. The cooperative task switching by the main processor unit 200 and the graphic processor unit 100 may be performed in accordance with the same procedure as described in the first embodiment with reference to FIG. 3 or as described in the second embodiment.

Similarly to the third embodiment, the sub-processor 30 for controlling data transfer is referred to as a transfer control processor and denoted by the numeral 31. When the need for image processing arises in a sub-processor 30, the sub-processor 30 transfers rendering data c necessary for the image processing to the transfer control processor 31. The transfer control processor 31 determines whether the task C being processed by the sub-processor 30 matches the task being processed by the management processor 32. If they match, the transfer control processor 31 transfers information, such as the address in the transfer control processor 31 at which the rendering data c is stored, the transfer size, the transfer direction and the like, to the graphic processor task switching unit 74 of the control block 20 in the graphic processor unit 100. The graphic processor task switching unit 74 outputs a data transfer command that includes the transfer information it received to the graphic processor DMA controller 22. The graphic processor DMA controller 22 reads the rendering data c from the transfer control processor 31 in accordance with the input transfer information and outputs the read data to the graphic memory 10.

If the task C being processed by the sub-processor 30 is different from the task being processed by the management processor 32, the transfer control processor 31 transfers the rendering data c to the main memory 50. An area for storing rendering data from the transfer control processor 31 may be reserved in the main memory 50. Subsequently, at a point of time when the management processor 32 switches to the task C and the graphic processor unit 100 is ready to accept the image process C', the transfer control processor 31 transmits the information including the data address of the rendering data c saved in the main memory 50, the transfer size, etc. to the graphic processor task switching unit 74 of the graphic processor unit 100. The graphic processor task switching unit 74 outputs a data transfer command that includes the transfer information it received to the graphic processor DMA controller 22. The graphic processor DMA controller 22 reads the rendering data c from the main memory 50 in accordance with the input information and outputs the read data to the graphic memory 10.

As described above, according to the fifth embodiment, one of the sub-processors 30 is configured as a processor dedicated to data transfer to the graphic processor unit 100. The data transfer process is performed by the graphic processor DMA controller 22 inside the graphic processor unit 100. With this, the data transfer request, the data transfer process and the like are subject to control by the transfer control processor 31 and the graphic processor DMA controller 22 so that the load placed on the graphic processor unit 100 and the main processor unit 200 in the data transfer process is reduced. Accordingly, similar effects as those of the first embodiment are achieved while successfully reducing the overhead involved in task switching.

Described above is an explanation based on the embodiments. The embodiments are only illustrative in nature and it will be obvious to those skilled in the art that variations in constituting elements and processes are possible within the scope of the present invention.

In the image processing apparatus 1000 according to the embodiments, the graphic processor unit 100 and the main processor unit 200 may be integrally fabricated as a single LSI chip or as separated chips. The blocks described in the embodiments are not limited in their level of integration. Any combination of constituting elements may be integrated or configured as a separate chip.

When the task switching scheduling can be predetermined for a plurality of applications processed and when it is obvious that the scheduling does not change in the middle of the process, the main processor unit 200 and the graphic processor unit 100 may cooperate with each other such that the processors respectively switch between tasks according to the predetermined scheduling as originally determined.

While the main processor unit 200 is described as a multiprocessor, the present invention is equally applicable to a single processor executing an application involving some sort of switching between processes in the middle of the execution. The graphic processor unit 100 may be configured as a multiprocessor so that the present invention is applied to each of the processors to enable cooperation with the main processor unit 200.

What is claimed is:

1. An information processing apparatus comprising:
a main processor unit which integrally controls the information processing apparatus as a whole and switches between a plurality of tasks, each task corresponding to an application; and
a graphic processor unit which performs image processing corresponding to the tasks being processed in the main processor unit, by using data related to the tasks and transmitted by the main processor unit, wherein
when the main processor unit transmits data related to a first task corresponding to a first application to the graphic processor unit, if the graphic processor unit is performing image processing corresponding to a second task corresponding to a second application different from the first application, the main processor unit changes the destination of the data related to the first task to a memory and saves the data related to the first task for later restoration at least until the graphic processor unit completes the image processing corresponding to the second task,
the main processor unit comprises a plurality of general-purpose processing units and uses one of the processing units as an interface circuit dedicated to the transmission of the data to the graphic processor unit, and
the data to be transmitted to the graphic processor unit is transiently transmitted to the interface circuit, and the interface circuit changes the destination of the data to the memory depending on which application the image processing performed by the graphic processor unit corresponds to,
the graphic processor unit performs image processing corresponding to a task being processed in one of the plurality of processing units, which is predetermined as a management processor, and
the interface circuit receiving the data to be transmitted to the graphic processor unit compares the task being processed by a processing unit originating the transmission with the task being processed by the management processor, and changes the destination of the data depending on the comparison result.

* * * * *